Patented Feb. 22, 1949

2,462,629

UNITED STATES PATENT OFFICE 2,462,629

SUNLIGHT RESISTANT COMPOSITION

Philip Tucker Gidley, Fairhaven, Mass., assignor, by mesne assignments, to Standard Oil Development Company, a corporation of Delaware No Drawing. Application November 11, 1944,
Serial No. 563,090

5 Claims. (Cl. 260—17)

1

This invention relates to new and useful compositions of matter which are resistant to the deterioration of sunlight. More particularly, this invention relates to a new oil resistant elastic substance which is also resistant to sunlight.

An object of this invention is to provide a sunlight resistant elastic composition which retains excellent extensibility and resistance to shock at extremely low temperatures. Another object is to provide a sunlight resistant elastic composition with low permanent set after extension, compression or torque. A further object is a sunlight resistant elastic composition with exceptional heat stability. Still another object is a sunlight resistant elastic composition resistant in addition to strong alkalis. Yet another object is a sunlight resistant composition with excellent low temperature flexibility while retaining desirably high deformation temperatures under load or stress. Another object is to advance the art. Still other objects will appear hereinafter.

My invention consists predominantly of an intimate mixture of a butadiene acrylonitrile copolymer and an ethyl cellulose substance.

Any butadiene acrylonitrile copolymer may be employed, but I prefer the copolymer of 74% butadiene and 26% acrylonitrile. By the ethyl cellulose substance to be employed in my invention I mean the cellulose product obtained by replacing the one or more hydrogens of the reactive hydroxyl groups of cellulose with one or more ethyl groups. As stated, the reaction need not be carried to completion, partial substitution being suitable or in some cases more desirable.

Ethyl cellulose may be prepared by any known means, as for example, the method of Dreyfus, French Patent 462,274 in 1912; the method of Lilienfeld, British Patent 12,854 in 1912; or the method of Leuchs, German Patent 322,586 in 1920.

It is well known that ethyl cellulose compositions, sufficiently plasticized for a low temperature flexibility of —80° centigrade approximately, have such high permanent set (up to 100%) under slow tension or distortion as to render them useless for the many applications where low permanent set is required. My new compositions overcome this difficulty.

Compositions resistant to sunlight and oil are known but many have the disadvantage of poor heat stability; for example, polyvinyl chloride compositions, or mixtures of large amounts of polyvinyl chloride and synthetic elastomers. In contrast to the critical behaviour of the polyvinyl chloride compositions, my new compositions have remarkable heat stability.

I believe the desirable and co-existing combination of properties of my new compositions are unique and are as follows:

2

1. Extreme low temperature flexibility.
2. Low permanent set.
3. Oil resistance.
4. Low specific inductive capacity.
5. High insulation strength (electrical).
6. Heat stability.
7. Low power factor.
8. Alkali resistance.
9. Sunlight resistance.
10. Ozone resistance.

The following examples will serve to illustrate my invention:

EXAMPLE 1

The following recipes were prepared for this example:

PART A

| | Parts |
|---|---|
| Ethyl cellulose (48% ethoxy content) | 100 |
| Tributyl phosphate | 40 |
| Tricresyl phosphate | 30 |
| Zinc oxide | 18 |
| Paraffin wax | 5 |

PART B

| | Parts |
|---|---|
| Butadiene acrylonitrile copolymer (74:26) | 100 |
| Zinc oxide | 10 |
| Carbon black | 55 |
| Sulfur | 2 |
| Benzothiazyldisulfide | 1.5 |
| Paraffin | 2 |
| Phenyl beta naphthylamine | 1.5 |
| Tributyl phosphate | 20 |

The two parts were mixed separately on conventional rubber mill rolls. Part A was mixed on hot rolls. When each separate part was homogeneously mixed, Part A was added to Part B and thoroughly blended by continued mixing.

The mixture was then vulcanized 60 minutes at 308° Fahrenheit with test results as indicated in Table 1.

Table 1

| | |
|---|---|
| Tensile strength | 3055 lbs. per sq. in. |
| Ultimate elongation | 7% |
| Permanent set | 475% |
| Low temperature flexibility (90° bend) | —100° Fahrenheit |
| Water absorption (1 week at 70° Fahrenheit) | 32% |
| Oil resistance | Excellent |
| Sunlight resistance | Do. |
| 20% caustic soda resistance | Do. |
| Electrical resistivity | Very good |
| Aging resistance (4 days @ 212° F.) | Appearance unchanged |

EXAMPLE 2

The following recipe was used for this example:

PART A

| | Parts |
|---|---|
| Ethyl cellulose (48% ethoxy) | 100 |
| Zinc oxide | 10 |
| Clay | 20 |
| Tricresyl phosphate | 60 |
| Paraffin | 10 |

PART B

| | Parts |
|---|---|
| Butadiene acrylonitrile copolymer | 100 |
| Zinc oxide | 5 |
| Clay | 100 |
| Whiting | 25 |
| Benzothiazyl disulfide | 2 |
| Sulfur | 2 |
| Paraffin | 3 |
| Phenyl alpha naphthylamine | 1.5 |
| Tricresyl phosphate | 10 |
| Mineral rubber | 20 |

The two parts were mixed as described in Example 1 and similarly cured. Test results are indicated in Table 2.

Table 2

| | |
|---|---|
| Tensile strength | 1790 lbs. per sq. in. |
| Ultimate elongation | 510% |
| Sunlight resistance | Excellent |
| Electric resistivity | Excellent |

It is obvious to one skilled in the art that other compounding ingredients may be employed and other ratios of butadiene acrylonitrile and ethyl cellulose than 1:1.

Other plasticizers than tricresyl phosphate may be employed, of which the following list is intended as illustrative only:

| | |
|---|---|
| Tributoxyethyl phosphate | Lauryl alcohol |
| Paraffin oil | Benzyl benzoate |
| Castor oil | Amyl oleate |
| Dibutyl stearate | Chlorinated diphenyl |
| Dibutyl phthalate | Cetyl alcohol |
| Dibutyl sebacate | Linseed oil |
| Triacetin | Blown oils |
| Amyl stearate | Alkyd resins |
| Stearic acid | Alcohol-soluble resins |
| Palmitic acid | Oleic acid |

My new compositions may be fabricated readily. They can be tubed, calendered, milled, Banbury mixed, formed on wire, molded, sheeted, used as an impregnant for fabric, and otherwise processed.

I claim:

1. As a new composition of matter, a vulcanizable mixture consisting predominantly of substantially equal parts of a rubbery butadiene-acrylonitrile copolymer and ethyl cellulose said composition also comprising sulphur and a vulcanization accelerator.

2. The composition as defined in claim 1 wherein the rubbery copolymer consists of butadiene and acrylonitrile in the ratio substantially of 74 parts of the former to 26 parts of the latter.

3. As a new composition of matter, a vulcanizable mixture consisting predominantly of a rubbery copolymer of substantially 74 parts of butadiene with substantially 26 parts of acrylonitrile and ethyl cellulose, together with plasticizers, fillers, sulfur and a vulcanization accelerator, the rubbery copolymer and the ethyl cellulose being present in the composition in substantially equal parts by weight.

4. A vulcanized rubbery composition containing a vulcanizing agent and substantially equal portions of a rubbery butadiene acrylonitrile copolymer and ethyl cellulose.

5. A vulcanized sunlight resistant elastic composition consisting of 100 parts of ethyl cellulose of 48% ethoxy content; 100 parts of rubbery butadiene-acrylonitrile copolymer; 60 parts of tributylphosphate; 30 parts of tricresylphosphate; 28 parts of zinc oxide; 7 parts of paraffin wax; 55 parts of carbon black; 2 parts of sulphur; 1.5 parts of benzothiazyldisulfide and 1.5 parts of phenylbetanaphthylamine; said composition being characterized by a tensile strength of 3,055 lbs. per sq. in., and a permanent set of 7%.

PHILIP TUCKER GIDLEY.

REFERENCES CITED

The following references are of record in the file of this patent:

UNITED STATES PATENTS

| Number | Name | Date |
|---|---|---|
| 1,723,632 | Stine et al. | Aug. 6, 1939 |
| 2,273,425 | Traylor | Feb. 17, 1942 |
| 2,332,194 | Beekley et al. | Oct. 19, 1943 |

FOREIGN PATENTS

| Number | Country | Date |
|---|---|---|
| 376,531 | Italy | Nov. 17, 1939 |